United States Patent
Ogg et al.

(10) Patent No.: US 8,041,820 B2
(45) Date of Patent: Oct. 18, 2011

(54) DIAL-UP ACCESS MANAGER

(75) Inventors: Jennifer L. Ogg, Hilliard, OH (US); Daniel W. Dosmann, Upper Arlington, OH (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1736 days.

(21) Appl. No.: 10/292,636

(22) Filed: Nov. 13, 2002

(65) Prior Publication Data

US 2003/0097450 A1  May 22, 2003

Related U.S. Application Data

(60) Provisional application No. 60/335,538, filed on Nov. 16, 2001.

(51) Int. Cl.
*G06F 15/16* (2006.01)
(52) U.S. Cl. .................................... 709/227; 709/228
(58) Field of Classification Search .................. 709/203, 709/219, 227, 228, 229
See application file for complete search history.

(56) References Cited

U.S. PATENT DOCUMENTS

| | | | | |
|---|---|---|---|---|
| 5,732,275 A * | 3/1998 | Kullick et al. | ................ | 717/170 |
| 5,802,304 A * | 9/1998 | Stone | ............................ | 709/227 |
| 6,158,010 A * | 12/2000 | Moriconi et al. | ................. | 726/1 |
| 6,167,567 A * | 12/2000 | Chiles et al. | .................. | 717/173 |
| 6,205,126 B1 * | 3/2001 | Moon | ........................... | 370/329 |
| 6,317,597 B1 * | 11/2001 | Baker et al. | ............... | 455/426.1 |
| 6,578,076 B1 * | 6/2003 | Putzolu | ....................... | 709/223 |
| 6,795,852 B1 * | 9/2004 | Kleinrock et al. | ............ | 709/220 |
| 6,941,472 B2 * | 9/2005 | Moriconi et al. | ................. | 707/9 |
| 2002/0059209 A1 * | 5/2002 | Kung | ............................... | 707/3 |
| 2002/0069282 A1 * | 6/2002 | Reisman | ....................... | 709/227 |
| 2002/0083429 A1 * | 6/2002 | Rozenfeld et al. | ........... | 717/174 |
| 2003/0115344 A1 * | 6/2003 | Tang et al. | .................... | 709/229 |
| 2003/0200321 A1 * | 10/2003 | Chen et al. | .................... | 709/229 |

* cited by examiner

*Primary Examiner* — Yemane Mesfin (57) ABSTRACT

A network access management tool includes a dialer that connects users to a network, such as the Internet. An integrated phonebook automatically looks-up optimal phone number(s) to dial. The network access management tool may additionally help the user to automate virtual private network (VPN) connections, may include automated software update capabilities, and may take into account corporate policy information when making network connectivity decisions.

19 Claims, 6 Drawing Sheets

ADVANCED CONNECTIONS

Physical Device: Xircom CreditCard Modem 56-Global

Dialing
☐ Local call :   ☐ Long distance :
☐ Disable call waiting
☐ Use pulse dial If tone dialing isn't available)

☑ Automatically create secure (VPN) connection
You can access the public internet without a secure connection Calling from
Country: United States
My Number XXXX Prefer: ● Lowest cost   ○ Highest speed Dialing list

| Use | Number | City | Surcha... | Provider |
|---|---|---|---|---|
|  |  |  |  |  |
|  |  |  |  |  |
|  |  |  |  |  |

☐ Enter number manually: ______ (dialed first)

Done

Fig. 6

DIAL-UP ACCESS MANAGER

RELATED APPLICATION

This application claims priority under 35 U.S.C. §119 based on U.S. Provisional Application No. 60/335,538, filed Nov. 16, 2001, the disclosure of which is incorporated herein by reference.

BACKGROUND OF THE INVENTION

A. Field of the Invention

The present invention relates generally to network access, and more particularly, to dial-up network access software.

B. Description of Related Art

People often find it necessary to connect to a network, such as the Internet or a corporate network, when they are away from work. Business travelers, in particular, may connect to their corporate network to perform functions such as sending/receiving email, viewing corporate documents, or uploading files to the corporate network. When traveling, dial-up connections over phone lines are often used to make the network connection.

Dial-up connections are frequently initiated using dial-up management software. This software may perform basic dial-up functions, such as controlling a modem to dial a number entered by the user and negotiating network logon with the host. When traveling, users often initiate dial-up connections to hosts that are in the local calling zone of the user. To do this, the user first looks-up the local number and then manually enters the local number into the dial-up management software.

There is a need in the art for improved dial-up management software.

SUMMARY OF THE INVENTION

Systems and methods consistent with the principles of this invention provide a network access management tool that is particularly beneficial to entities that have multiple mobile computing devices that wish to connect to a network.

One aspect consistent with the invention is direction to a dial-up connection manager. The dial-up connection manager includes a dialer component that connects to a network using a selected access number. A phonebook component stores the access numbers and automatically updates the stored access numbers from a phonebook server when the dialer component has made a network connection. The selected access number is selected from the phonebook component based on factors including at least one of cost of the network connection and access speed.

Another aspect consistent with the invention is directed to a dial-up connection manager that includes a number of elements. A user interface presents network connectivity options to a user and receives commands from the user. A dialer connects to a network via a dial-up connection. A client policy component obtains policy information created on behalf of an employer of the user when the user connects to the network. The client policy component modifies the user interface based on the policy information.

Yet another aspect consistent with the invention is directed to a method that includes looking up an appropriate network access number from a phonebook of possible access numbers based on current area code/exchange information; connecting to a network using the looked-up access number; automatically downloading updates for the phonebook when connected to the network; and automatically downloading policy information when connected to the network, the policy information defining customizations to the access manager.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

A network access management tool is described herein. The tool includes one or more software components that simplify and provide advanced network connectivity services. In particular, the network access management tool includes a dialer that connects users to a network such as the Internet. An integrated phonebook may automatically look-up the optimal (e.g., the most cost effective) phone number(s) to dial. The tool may additionally help the user to automate virtual private network (VPN) connections, may include automated software update capabilities, and may take into account corporate policy information when making network connectivity decisions.

Figure 1:
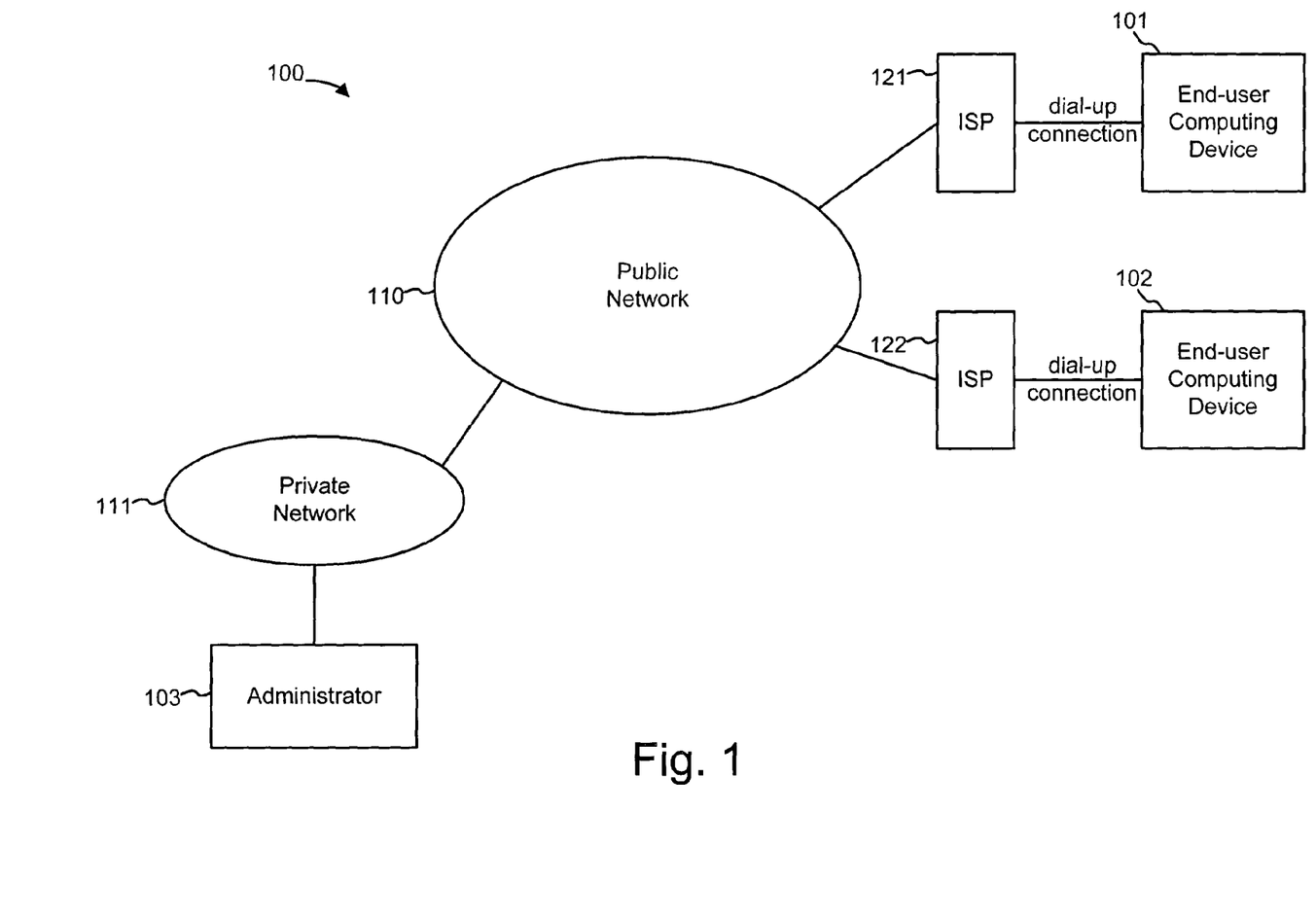
FIG. 1 is a diagram illustrating an exemplary system on which concepts consistent with the invention may be implemented.

FIG. 1 is a diagram illustrating an exemplary system 100 on which concepts consistent with the invention may be implemented. System 100 includes computing devices 101-103, which may be coupled together through one or more networks 110 and 111. Network 110 may be a wide area network (WAN) such as the Internet. Network 110 may connect to another network, such as a private (e.g., corporate) network 111. Corporate network 111 may be a local area network (LAN) or WAN in which access to the network is restricted to, for example, employees of a corporation. Users of corporate network 111 may access resources of public network 110 through a gateway router and/or firewall (not shown) that connects corporate network 111 to network 110.

Computing devices 101 and 102 may be computing devices of end-users of corporate network 111. For example, computing devices 101 and 102 may be laptop computers given to employees of the corporation that controls corporate network 111. When traveling, or when otherwise away from corporate network 111, the employees may access resources on corporate network 111 though a modem connection to network 110. More particularly, computing devices 101 and 102 may call a telephone number that corresponds to a point of presence (POP) of an internet service provider (ISP), such as ISPs 121 and 122. ISPs 121 and 122 implement the connections to network 110. Through network 110, computing devices 101 and 102 may connect to corporate network 111. Generally, it is desirable for computer devices 101 and 102 to call access numbers that are in the local calling area of the computing device.

In situations in which the users of computing devices 101 and 102 are dealing with sensitive information, computing devices 101 and 102 may form virtual private network (VPN) links with devices on corporate network 111. A VPN connection is a well known technique for using a public telecommunication infrastructure, such as the Internet, to provide remote offices or users with secure access to their organization's networks. VPNs encrypt data sent over the public infrastructure, thus creating a secure "tunnel" that cannot be "entered" by eavesdroppers. Alternatively, instead of establishing a VPN, computing devices 101 and 102 may directly dial to modems within corporate network 111.

Computing device 103 may be an administrative computing device coupled to corporate network 111. Through administrative computing device 103, an administrator may control configuration options on end-user computing devices 101 and 102.

Figure 2:
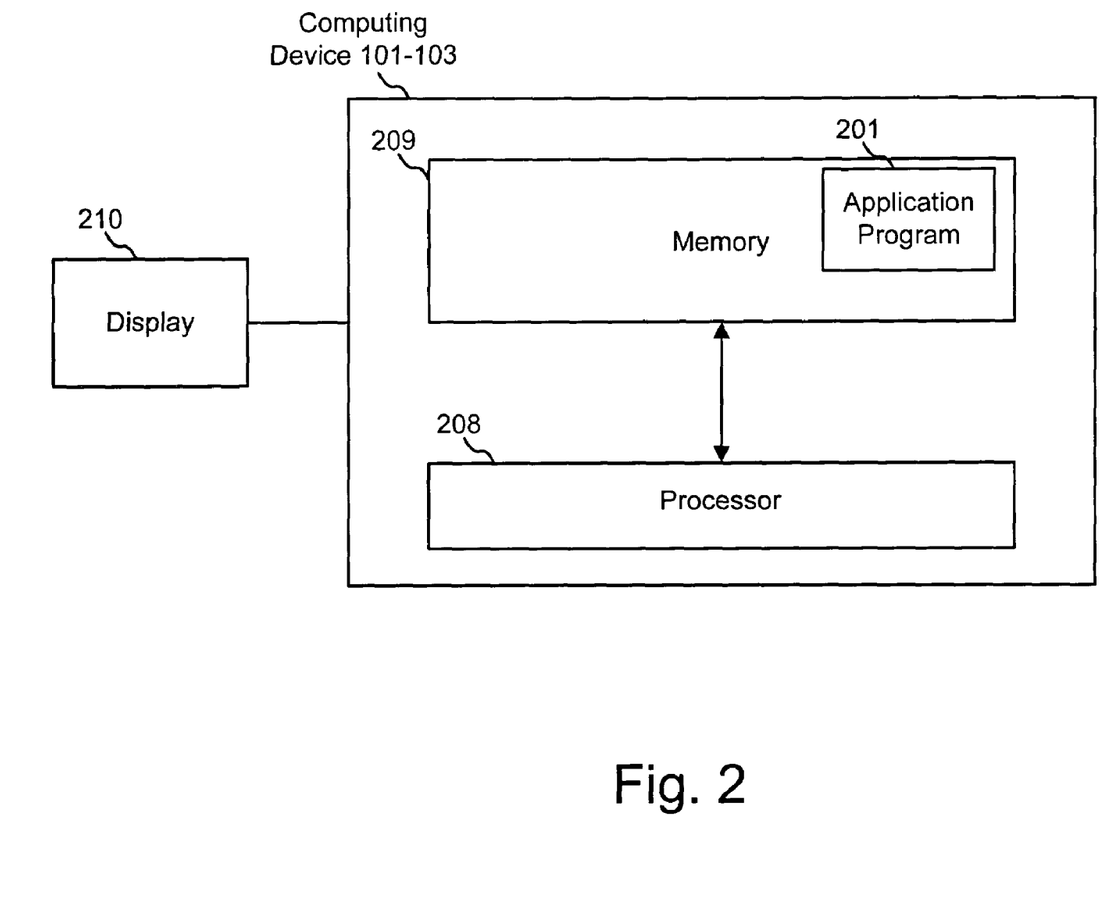
FIG. 2 is a diagram illustrating an exemplary configuration of a computing device shown in FIG. 1 in additional detail.

FIG. 2 is a diagram illustrating an exemplary configuration of one of computing devices 101-103. Computing device 101-103 includes a computer-readable medium 209, such as random access memory, coupled to a processor 208. Processor 208 executes program instructions stored in memory 209. Computing device 101-103 may also include a number of additional external or internal devices, such as, without limitation, a mouse, a CD-ROM, a keyboard, a modem, a broadband network interface card, and a display. A display, in particular, is also shown in FIG. 2 as display 210.

Memory 209 contains an application program 201. In particular, application program 201 may implement a network access management tool consistent with the present invention. Network access management tool 201 may include a number of components located at multiple ones of computing devices 101-103. Thus, application program 201, executing on end-user computing devices 101 or 102 may be a client-side portion of the network access management tool. When executing on computing device 103, application program 201 may be an administrator-side (i.e., administered at corporate network 111) network access management tool. Each of these components will be described in more detail below.

Figure 3:
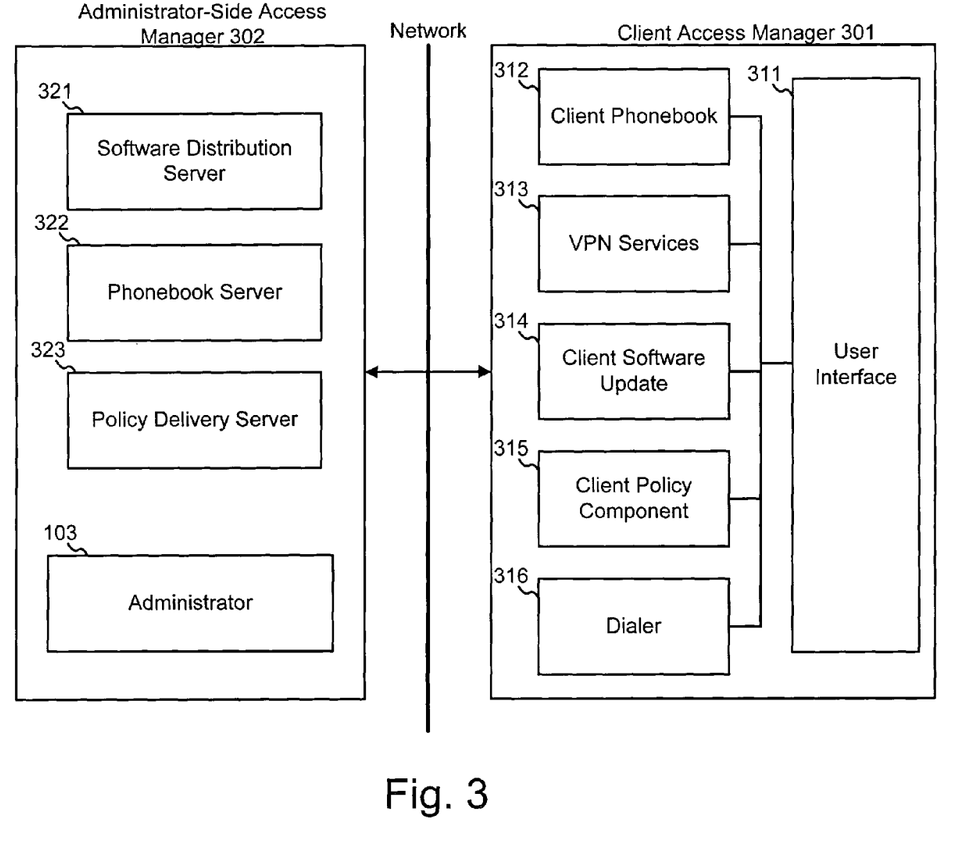
FIG. 3 is a block diagram illustrating functional components of a client-side management tool and a server-side access management tool consistent with the invention.

FIG. 3 is a block diagram illustrating functional components of the client-side management tool, labeled as client access manager 301, and the server-side access management tool, labeled as administrator-side access manager 302. Administrator-side access manager 302 can include a number of components that may execute from one or more computer devices. In particular, a number of computer servers may be used to implement administrator-side access manager 302. An administrator may monitor and/or control these servers from an administrator desktop computer 103.

As shown in FIG. 3, client access manager 301 may include a user interface component 311, a client phonebook component 312, a client VPN services component 313, a client software update component 314, a client policy component 315, and dialer component 316. Administrator-side access manager 302 may include a software distribution server 321, a phonebook server 322, and policy delivery server 323. From administrator computer 103, an administrator may monitor and/or control servers 321-323.

The components of client access manager 301 will next be discussed. User interface component 311 presents the user with the interface to client access manager 301. Through user interface component 301, the user may control the operation of the various components 312-316.

Figure 4:
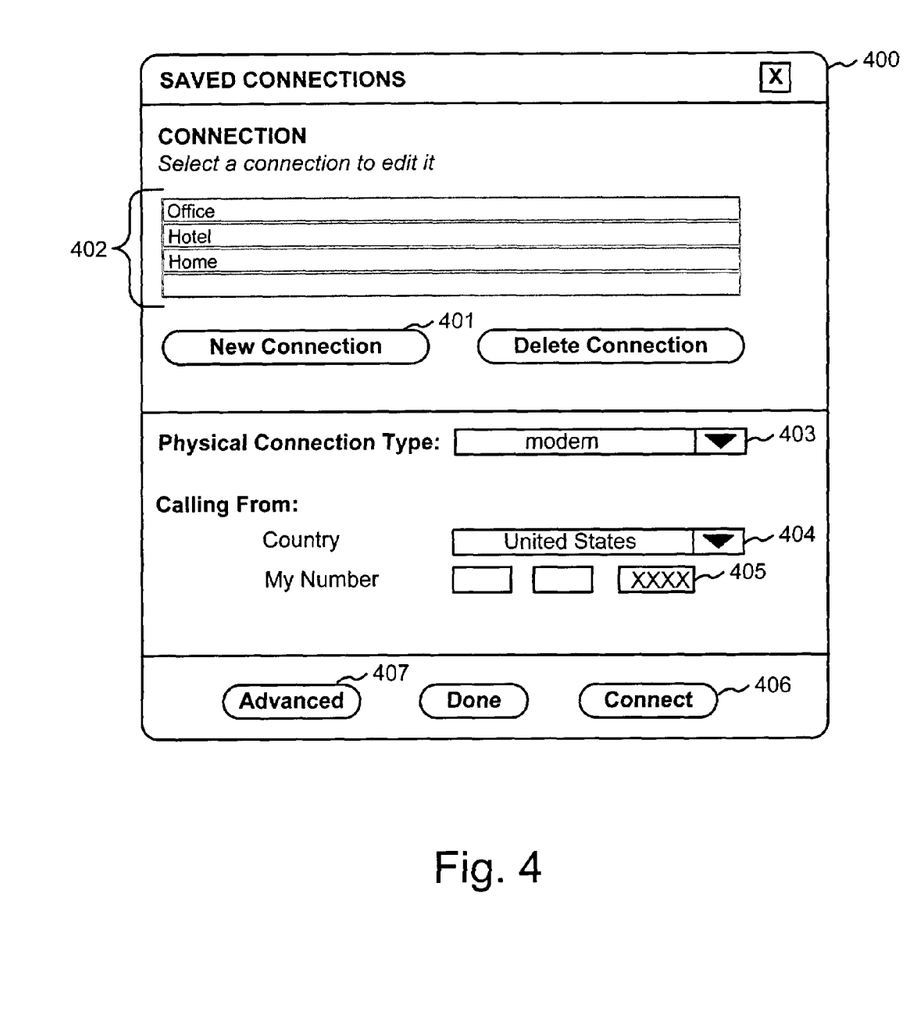
FIG. 4 is an exemplary user interface that may be displayed by the user interface component shown in FIG. 3.

FIG. 4 is an exemplary user interface 400 that may be displayed by user interface component 311. Through interface 400, a user may initiate a connection to a network, such as network 110. Interface 400 may be selected by the user in any of a number of conventional manners. For example, interface 400 may initially appear when the user initiates client access manager 301 or interface may be initiated when the user activates a "make connection" menu selection from another interface screen of client access manager 301.

Through interface 400, the user may create a new connection by selecting "new connection" button 401 or by selecting a previously saved connection from list 402. When the user presses new connection button 401, a dialog box (not shown) may appear asking the user to name the new connection and asking the user to select whether the new connection is a phone connection from a hotel or airport, a phone connection from a private residence, a high speed connection (e.g., a DSL connection), or a wireless connection. Based on the user's input, user interface component 311 may add an entry to list 402 and update the connection type drop-down box 403. At this point, the user may enter the country and phone number the user is calling from in boxes 404 and 405. If, instead of making a new connection, the user selects a previously created connection from list 402, user interface component 311 may fill in boxes 404 and 405 based on the previous use of that connection. The user may modify the values in boxes 404 and 405 if they are not correct.

When the input boxes in interface 400 have been completed, the user may initiate a network connection by selecting "connect" button 406. When button 406 is selected, client access manager 301 initiates the network connection. If the connection is a modem based connection, for example, client access manager 301 may use the entered connection information to look-up the appropriate access number to dial in client phonebook component 312 and then dial the number with dialer component 316. When "advanced" button 407 is selected, user interface 311 may display another interface (discussed below) that deals with more advanced connection options.

Returning to FIG. 3, client phonebook component 312 may contain a table or database of dial-up access numbers. The access numbers may include, for example, all of the access numbers for the ISP(s) with which the user/corporation is affiliated. As described in more detail below, client phonebook component 312 may automatically update its stored access number(s) from phonebook server 322. Client phonebook component 312 may search its stored numbers to find the optimal number(s) for the user. In general, client phonebook 312 may make the decision of which access number(s) are optimal based on factors including geography, access speed, and cost. For example, client phonebook component 312 may search by area code or phone exchange to find the access numbers that are local calls for the user. In certain situations, in which a non-local access number is nevertheless the most cost effective number, client phonebook 312 may return this number instead. Additionally, client phonebook 312 may take modem access speed into consideration when determining an optimal access number. For example, if two access numbers are of approximately the same cost, the one with the higher access speed may be chosen.

In one implementation consistent with principles of the invention, client phonebook component 312 may return multiple appropriate access numbers. If the first access number is busy or otherwise unavailable, the second access number may be automatically dialed. Alternatively, client access manager 301 may automatically redial busy access numbers.

Figure 5:
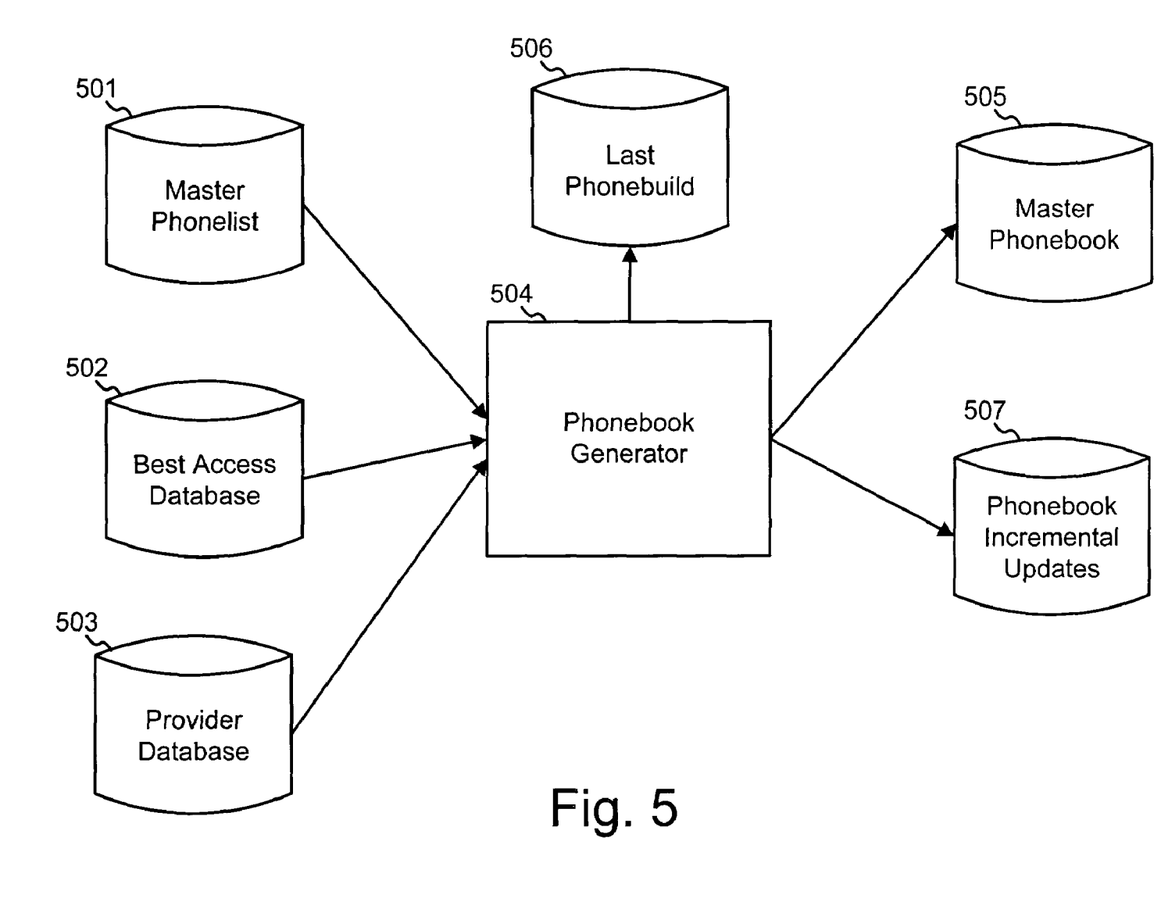
FIG. 5 is a diagram illustrating phonebook generation consistent with the invention.

FIG. 5 is a diagram illustrating the phonebook generation process. The process may be performed by phonebook server 322. Master phonelist database 501 contains each of the point of presence (POP) access numbers in the dial-up network. The "dial-up network" can include all ISPs associated with the user's corporation. More particularly, each row in the master phonelist database 501 may include information relating to the POP country, city, state, country code, area code, phone number, and ISP name. Best access database 502 stores a list of appropriate access numbers based on the area code/exchange from which a call originates. In particular, database 502 may associate each area code/exchange with all the access numbers that are local calls to the area code/exchange. Provider database 503 stores information about the ISPs. The information may include surcharge information, scripting information, and the name to display to the user. Databases 501-503 may be updated by an administrator in corporate network 111.

Based on master phonelist database 501, best access database 502, and provider database 503, phonebook generator component 504 generates a master phonebook 505. Master phonebook 505 may be an aggregate of databases 501-503. As the information in databases 501-503 is updated or modified, phonebook generator component 504 may update master phonebook 505. Whenever phonebook 505 is updated or modified, the modification date and time may be written to last phonebuild file 506. In one implementation, phonebook 505 is updated approximately every two weeks. Additionally, an indication of each of the changes made to phonebook 505 may be stored in phonebook incremental update database 507. When updating the phonebook at client access manager 301, instead of downloading the entire phonebook 505, client phonebook component 312 may only download the incremental updates in incremental update database 507 that correspond to updates since the last time client phonebook component 312 was updated. In this manner, client access manager 301 may keep an up-to-date phonebook without having to frequently download a complete copy of the phonebook in phonebook database 505. When a user does not logon for a long period (e.g., 6 months), the complete phonebook 505 may alternatively be downloaded.

In addition to helping the user dial optimal access numbers, client access manager 301 assists users in creating secure connections. Specifically, through VPN services component 313, client access manager 301 assists users in establishing a VPN connection to corporate network 111. When a user selects a VPN connection, VPN services component 313 establishes a secure connection with corporate network 111. VPN services component 313 may, for example, establish an encrypted tunnel over public network 110 with a corresponding VPN device in corporate network 111. All information exchanged between the user and the corporate network may be encrypted and transmitted through the tunnel.

Figure 6:
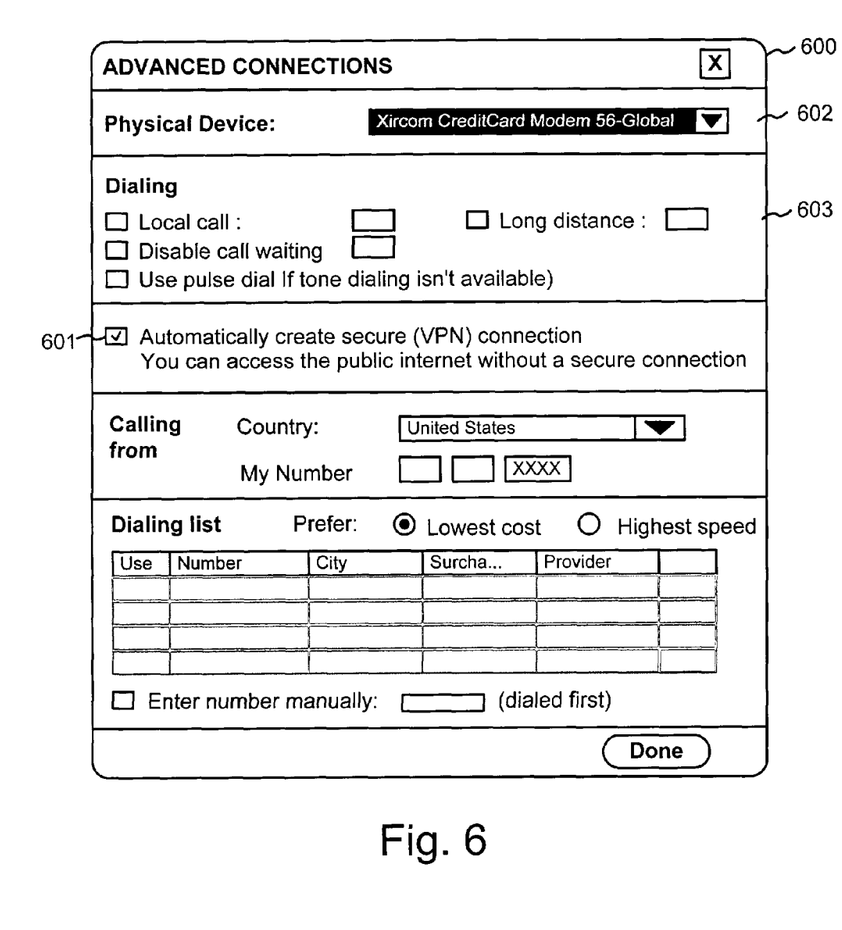
FIG. 6 is another exemplary graphical interface that may be displayed by the user interface component shown in FIG. 3.

Users may activate a VPN connection through a graphical VPN selection icon. FIG. 6 is an exemplary graphical interface 600 that may be displayed by user interface component 311. Interface 600 may be displayed in response to a user selecting "advanced" button 407. Through user interface 600, users may select that a particular communication session be a VPN connection by selecting checkbox 601. Additional connection options may be input through graphical interface 600. For example, through pull-down menu 602, the user may specifically identify the modem to use for the network connection. In dialing options section 603, the user may configure advanced dial-up options, such as prefix numbers to use for calls, pulse dialing, and whether to disable call waiting, etc.

Programming modifications or upgrades may occasionally be made to client access manager 301. Returning to FIG. 3, client software update component 314 may facilitate these upgrades to client access manager 301. Instead of requiring a user to download and manually install an upgrade file, client software update component 314 may automatically perform this function. Client software update component 314 may determine whether a software update is available whenever the user makes a network connection through client access manager 301 by querying software distribution server 321. If a software upgrade is available, client software component 314 may download and install the upgrade from server distribution software 321.

In a typical application of client access manager 301, a corporation may install an instance of client access manager 301 on multiple laptop computers. For example, each member of a traveling sales force may be issued a laptop computer equipped with client access manager 301. Through policy delivery server 323 and client policy component 315, administrators can automatically update and enforce policies for multiple instances of client access manager 301. Thus, in this situation, the client access manager used by each salesperson may be automatically configured based on company policy whenever the salesperson connects to the network.

An administrator may enter the policy information into policy delivery server 323. The policy information may include, for example: (a) phone connections to add or delete from the saved connection list 402 (FIG. 4), (b) whether client access manager 301 should block the calling of 800 numbers, (c) helpdesk information, (d) pre-connect message(s), and (e) whether to disconnect after a set idle time. One of ordinary skill in the art will appreciate that other policies may also be set.

More particularly, regarding (c), an administrator may customize the support information a user sees when the user requests help within client access manager 301. For example, different support numbers may be given to different users. The sales force may receive one number while an executive group may receive another number. Regarding (d), messages may be displayed to users when they initially start client access manager 301 or at other points during the execution of client access manager 301. These messages may be set by the administrator. Regarding (e), to save phone charges and/or ISP connection time, client access manager 301 may automatically log the user off after a predetermined period of inactivity. This automatic log-off feature, as well as the predetermined time period that elapses before logging a user off, may be set by an administrator.

In operation, client policy component 315 may automatically, without user intervention, contact policy delivery server 323 at predetermined occasions when the user is logged onto the network. For example, every time the user initially logs onto the network, client policy component 315 may contact policy delivery server 323 and inquire whether there is any new policy information to download. If so, client policy component 315 may download the new policy information and customize client access manager 301 based on the policy information.

Dialer component 316 may include software for interfacing with a modem in the user's computing device. Dialer component 316 controls the modem to dial the access number determined by client access manager 301. Client access manager 301 may also be configured to connect the user to a network through a broadband connection. In this situation, dialer component 316 may additionally include functionality for interfacing with a broadband interface, such as a conventional Ethernet network interface card. Further, dialer component 316 may also be used to dial numbers in a wireless network to establish wireless network connections.

Client access manager 301 may include additional features to those described above. For example, client access manager 301 may provide feedback to corporate network 111 relating to the network connections. The feedback can include, for example, connection quality or availability information.

As described above, a network access management tool includes a number of integrated features that assist users in forming network connections. The features may include automatic lookup of access numbers, automatic integration of corporate policy, and automatic software upgrades. The network access management tool accordingly provides a set of features that allow for the cost-effective and efficient management of a large number of mobile dial-up computing devices (e.g., laptop computers).

The foregoing description of preferred embodiments of the invention provides illustration and description, but is not intended to be exhaustive or to limit the invention to the precise form disclosed. Modifications and variations are possible in light of the above teachings or may be acquired from practice of the invention.

Certain portions of the invention have been described as software that performs one or more functions. The software may more generally be implemented as any type of logic. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A dial-up connection manager, stored in a non-transitory computer readable medium, the dial-up connection manager comprising:
    a dialer component, implemented at least partially in hardware and implemented at an end-user device, the dialer component to:
        connect to a network using a selected one of a plurality of access numbers;
    a phonebook component, implemented at least partially in hardware and implemented at the end-user device, the phonebook component to:
        store the plurality of access numbers, and
        automatically update the stored plurality of access numbers from a phonebook server of an administrator access manager when the dialer component has made a network connection, the updating occurring over the network connection; and
    a client policy component implemented at least partially in hardware, the client policy component to:
        selectively block, based on policy information automatically downloaded over the network from a policy delivery server of the administrator access manager, certain access numbers, and
        selectively show, based on the policy information, a message to a user before the dialer component connects to the network,
    where the selected access number is selected from the phonebook component based on factors including at least one of cost of the network connection or access speed, and
    where the factors are at least partially based on feedback associated with a previously selected access number, the feedback being provided over the network to the administrative access manager by the dial-up connection manager.

2. The dial-up connection manager of claim 1, where the cost of the network connection is based on whether the plurality of access numbers are local calls.

3. The dial-up connection manager of claim 1, where the phonebook includes:
    information relating to a country, a city, a state, a country code, and an Internet Service Provider (ISP) name of the plurality of access numbers.

4. The dial-up connection manager of claim 1, where when automatically updating the stored plurality of access numbers the phonebook component is further to:
    download incremental changes to the phonebook component from the phonebook server.

5. The dial-up connection manager of claim 1, further comprising:
    a software update component to:
        automatically download and install software upgrades to the dial-up connection manager.

6. The dial-up connection manager of claim 1, further comprising:
    a virtual private network (VPN) component to:
        enable the dialer component to connect to the network via a VPN connection.

7. A dial-up connection manager, stored in a non-transitory computer readable medium, the dial-up connection manager comprising:
    a user interface to:
        present network connectivity options to a user, and
        receive commands from the user;
    a dialer component, implemented at least partially in hardware, to:
        connect to a network via a dial-up connection;
    a client policy component, implemented at least partially in hardware, to:
        automatically obtain policy information created on behalf of an employer of the user when the user connects to the network, and
        modify the user interface based on the policy information; and
    a phonebook component, implemented at least partially in hardware, to:
        store a plurality of access numbers for the dial-up connection,
        automatically update the plurality of access numbers when the dialer component has made a network connection, and
    where the phonebook component updates the plurality of access numbers based on feedback provided by the dial-up connection manager to a network device of the employer, the feedback relating to connection quality and availability information associated with at least one of the plurality of access numbers,
    where the user interface, the dialer component, the client policy component, and the phonebook component are implemented at a device associated with the user.

8. The dial-up connection manager of claim 7, where the policy information is obtained from a policy delivery server.

9. The dial-up connection manager of claim 7, where the policy information relates to at least one of:
help desk information, or
customized messages.

10. The dial-up connection manager of claim 7, where at least one access number is selected from the phonebook component based on factors including at least one of a cost of the dial-up connection and an access speed.

11. The dial-up connection manager of claim 10, where the cost of the dial-up connection is based on whether the plurality of access numbers are local calls.

12. The dial-up connection manager of claim 10, where for each of the plurality of access numbers, the phonebook component includes:
corresponding information relating to a country, a city, a state, a country code, and an Internet Service Provider (ISP) name.

13. The dial-up connection manager of claim 10, where, when automatically updating the plurality of access numbers, the phonebook component is further to:
download incremental changes to the phonebook component.

14. The dial-up connection manager of claim 7, further comprising:
a software update component to:
automatically download and install software upgrades to the dial-up connection manager from a software distribution server.

15. The dial up connection manager of claim 7, further comprising:
a virtual private network (VPN) component to:
enable the dialer component to connect to the network via a VPN connection.

16. A method implemented by an access manager, the method comprising:
retrieving, by the access manager, an appropriate network access number from a phonebook of possible access numbers based on current area code/exchange information, the phonebook being stored at a device of an end-user;
connecting, by the access manager, to a network using the retrieved network access number;
automatically downloading updates for the phonebook when the access manager connects to the network where the updates for the phonebook are at least partially based on feedback previously provided by the access manager, the feedback including connection quality information or connection availability information;
automatically downloading policy information when the access manager connects to the network;
selectively blocking, by the access manager and based on the downloaded policy information, certain access numbers; and
selectively showing, by the access manager, messages described in the policy information to a user before connecting to the network.

17. The method of claim 16, where the updates for the phonebook are incremental phonebook updates.

18. The method of claim 16, where the phonebook includes:
information relating to a country, a city, a state, a country code, and an Internet Service Provider (ISP) name of the access numbers.

19. The dial-up connection manager of claim 1, where the feedback includes:
information relating to a quality of the network connection, and
information relating to an availability of the network connection.

* * * * *